United States Patent [19]

Fukuyoshi et al.

[11] Patent Number: 4,701,704
[45] Date of Patent: Oct. 20, 1987

[54] NON-DIRECTIONAL TOUCH SIGNAL PROBE

[75] Inventors: Minoru Fukuyoshi; Takashi Furuto; Tetsuo Nakamura, all of Kanagawa, Japan

[73] Assignee: Mitutoyo Mfg. Co., Ltd., Tokyo, Japan

[21] Appl. No.: 768,503

[22] Filed: Aug. 22, 1985

[30] Foreign Application Priority Data

Aug. 23, 1984 [JP] Japan .................................. 59-175766

[51] Int. Cl.⁴ ........................... G01B 7/28; G01B 7/14
[52] U.S. Cl. ....................................... 324/207; 33/558
[58] Field of Search ............................ 324/207, 208; 33/558-561; 336/30

[56] References Cited

U.S. PATENT DOCUMENTS 4,462,015  7/1984  Netzer .................................... 336/30
4,523,383  6/1985  Rogers et al. ......................... 33/558
4,530,159  7/1985  Ernst ...................................... 33/559

Primary Examiner—Reinhard J. Eisenzopf
Assistant Examiner—Walter E. Snow
Attorney, Agent, or Firm—Koda and Androlia

[57] ABSTRACT

A touch signal probe for electrically detecting the contact of a touch pin with a work to be measured in all three-axes directions. The apparatus can be attached to a three-dimensional coordinate measuring system to automatically detect electrical touch signals indicative of the contact with the work. The internal structure of the probe case is constructed such that a three dimensionally movable support can be attached thereto to provide a touch pin base which is movably supported on seats fixed on the probe case which carries the touch pin by means of a Z-axis movable support mechanism. The Z-axis support mechanism consists of a pair of diaphragms fixed on the upper and lower ends of the touch pin base at their peripheries respectively and a support shaft rigidly connected with the central portions of the diaphragms and holding the touch pin at its lower end. The movable touch pin base and the Z-axis support mechanism therefore can support the touch pin with three dimensional free movement relative to the probe case when the touch pin contacts the outer surface of the work. Furthermore, the apparatus has an electrical touch signal detector including several pairs of cores of magnetic material disposed on the support shaft and several pairs of detection coils mounted on the touch pin base to correspond to and be adjacent to each one of the pairs of cores respectively. Minute movement of the touch pin at the contact with the work changes the gap between any of the cores and the detection coils to generate an electrical touch signal from the coil.

4 Claims, 7 Drawing Figures

NON-DIRECTIONAL TOUCH SIGNAL PROBE

BACKGROUND OF THE INVENTION

1. Field of the Invention

The present invention relates to an improved touch signal probe which can accurately detect the motion of a pin contacting a work equally in multi-axis directions.

2. Prior Art

Three-dimensional coordinate measuring systems are currently utilized in the field of precise measurement since they can accurately effect the three-dimensional measurement of works having complicated shapes which are placed on a base and contacted by a probe.

In such a type of measuring machines, a movable probe is manually or automatically moved in three-dimensional directions to contact a work at given points of measurement whereat the coordinates of the probe moved in each of the three axes are read out. Recently, a touch signal probe is broadly used which is adapted to automatically detect electrical touch signals indicative of contact with a work. Such a probe can automatically be moved and measure works of complicated configurations.

In general, the touch signal probe includes a touch pin adapted to contact a work, the touch pin being movably supported by a probe case. The touch signal probe also includes means for absorbing the displacement of the touch pin on contacting the work and contact means located between the contact pin and the work or on the supporting mechanism for the touch pin.

In the prior art touch signal probes, however, the contact means is supported on the supporting portion for the touch pin at three points so that measurements will depend on the axis directions. Thus, stabilized measurements cannot be obtained in all directions. Such directional errors cannot be corrected in the prior art.

Instead of the above contact type probe, there has been proposed a probe which electrically detects the angular position or motion of a touch pin as by the use of a differential transformer. Indeed, such a differential transformer type probe cannot have a good sensitivity of detection. Particularly, the sensitivity of detection thereof is directional with respect to the movement of the touch pin.

SUMMARY OF THE INVENTION

It is therefore an object of the present invention to provide an improved touch signal probe which can more precisely detect non-directional touch signals in accordance with the principle of a differential transformer.

To attain the above object, the present invention provides a touch signal probe comprising a touch pin base movably supported in a probe case and having a single dwell position, upper and lower diaphragms mounted respectively on the upper and lower portions of the touch pin base, and touch pin holders carrying a touch pin and supported respectively by the upper and lower diaphragms movably in all the directions.

Thus, the touch pin and holders can be moved equally in all the directions when they contact a work.

The touch signal probe according to the present invention also comprises a plurality of pairs of detection means between the touch pin holders and the touch pin base and operative in accordance with the principle of a differential transformer to electrically detect the motion of the touch pin or holder means. Each of the detection means includes a pair of cores located on the touch pin holder body and a pair of detection coils disposed on the touch pin base opposing to the corresponding cores.

In accordance with the present invention, therefore, the motion of the touch pin in all the directions can be fetched as electrical signals by the pairs of detection coils with these electrical signals being combined to detect equally directional touch signals.

DETAILED DESCRIPTION OF THE INVENTION

Figure 1:
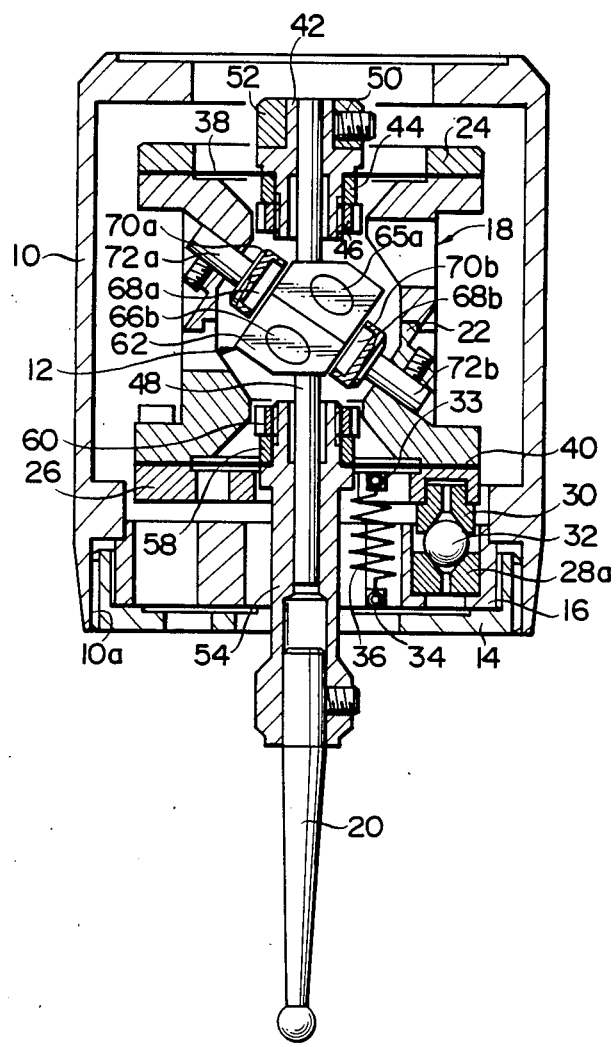
FIG. 1 is a longitudinal section of a preferred embodiment of a touch signal probe constructed according to the present invention.

Referring now to FIG. 1, there is shown a preferred embodiment of a touch signal probe constructed in accordance with the present invention, which comprises a probe case 10 including a mounting bracket attached to the top face thereof. Thus, the touch signal probe can detachably be mounted on the movable portion of a well-known three-dimensional coordinate measuring machine through the mounting bracket.

The probe case 10 includes an opening 10a formed therein at the bottom over which a bottom plate 14 is rigidly mounted by any suitable screw means. A substantially ring-like receiving plate 16 is interposed and fixed between the bottom plate 14 and the probe case 10.

Within the interior of the probe case 10 is movably supported a touch pin base 18 while maintaining its single dwell position. The touch pin base 18 holds a touch pin 20, which will be described hereinafter, through upper and lower diaphragms 38 and 40 and a support shaft 48.

In the illustrated embodiment, the touch pin base 18 consists of upper and lower plates 24 and 26 rigidly mounted on the top and bottom faces of a base spool 22, respectively. The touch pin base 18 is placed on the receiving plate 16 at the single dwell position.

In other words, the receiving plate 16 includes three seats 28a, 28b and 28c fitted thereinto at angular intervals of about 120 degrees. The bottom plate 26 of the touch pin base 18 includes the corresponding number of ball receivers 30 fitted into at positions opposing to the respective seats 28. By rigidly mounting a receiving ball 32 in each of the ball receivers 30 and then inserting the receiving ball 32 into the corresponding seat 28, the touch pin base 18 can be positioned on the receiving plate 16 at a proper location.

Figure 2:
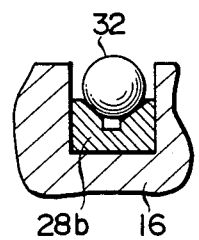
FIGS. 2 and 3 are cross-sectional views showing the construction of means for supporting the touch pin base shown in FIG. 1.
Figure 3:
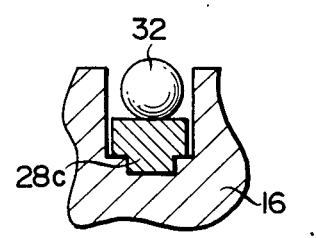

The three seats 28 have seat faces of different configurations from each other. In FIG. 1, the seat 28a has its conical seat face. The other seats 28b and 28c are respectively in the form of V-shaped groove and flat surface, as shown in FIGS. 2 and 3. These seats 28 serve to positively establish the dwell position of the base 18.

To urge the touch pin base 18 against the group of said seats 28, a biasing spring 36 is operatively mounted between a spring seat 33a on the bottom plate 26 of the touch pin base 18 and another spring seat 34 on the receiving plate 16. By providing three of such biasing springs arranged at angular intervals of about 120 degrees, the touch pin base 18 can positively be urged against the receiving plate 16 to hold its dwell position.

The present invention is characterized by the fact that the touch pin holder body 12 is supported relative to the touch pin base 18 by means of two diaphragms 38 and 40 through a support shaft 48 such that the touch pin 20 can be moved, with an improved sensitivity, in three directions X-, Y- and Z-axes.

Figure 4:
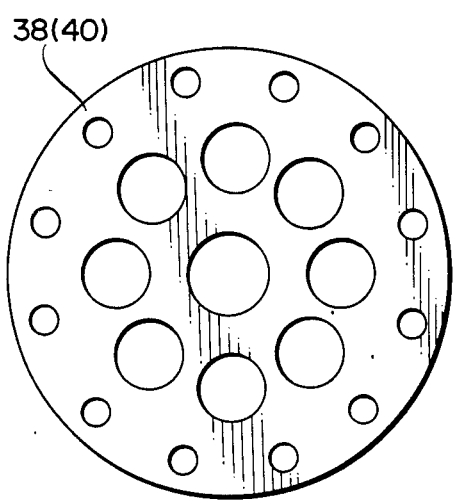
FIG. 4 is a plan view of one of the diaphragms shown in FIG. 1.

In other words, the upper diaphragm 38 is firmly sandwiched between the spool 22 and the upper plate 24 while the lower diaphragm 40 is rigidly sandwiched between the spool 22 and the lower plate 26, as seen from FIG. 4.

An upper touch pin holder 42 is rigidly connected with the central portion of the upper diaphragm 38 through a washer 44 and a set screw 46.

When the touch pin 20 is not contacted by the work, the former is precisely held in place by the upper and lower diaphragms 38 and 40 through upper and lower holders 42 and 54 and the holder body 12. As the touch pin 20 contacts the work, a core pedestal 62 is thus shifted to detect the contact of the touch pin 20 with the work in an increased sensitivity.

The upper touch pin holder 42 is in the form of a split ring which is connected with the support shaft 48 of the touch pin holder body 12. Thus, the upper end of the support shaft 48 can rigidly be connected with the upper touch pin holder 42 by tightening a screw 50 threaded into the ring 52. On the other hand, the lower end of the support shaft 48 is fixed to the upper portion of the lower holder 54 on which the touch pin 20 is detachably mounted. In such a manner, the above-mentioned components define a construction for suspending the touch pin 20 from the base 18.

The lower holder 54 is firmly connected with the central portion of the lower diaphragm 40 by means of a washer 58 and a set screw 60, as in the upper holder 42.

The present invention is intended to electrically detect the contact movement of the touch pin 20 and thus of the touch pin holder body 12 with an equally directional characteristic as the touch pin 20 is contacted by the work. For this end, the present invention provides a plurality of pairs of detection means located between the touch pin holder body 12 and the touch pin base 18 and operated in accordance with the principle of a differential transformer.

Figure 5:
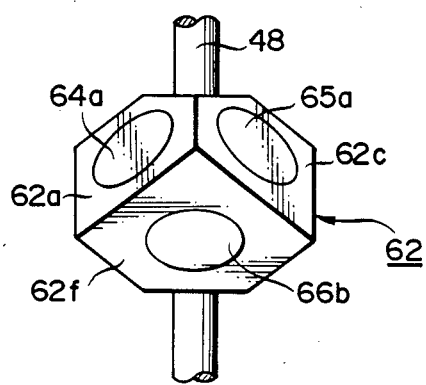
FIG. 5 is a front view of a core pedestal used in the embodiment of FIG. 1.
Figure 6:
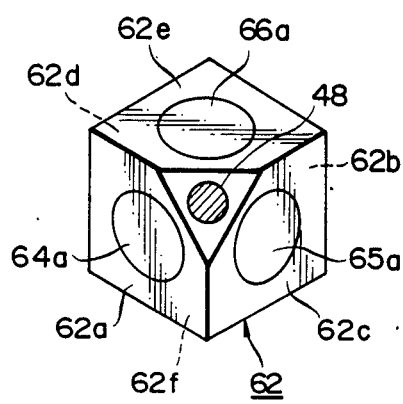
FIG. 6 is a plan view of the core pedestal shown in FIG. 5.
Figure 7:
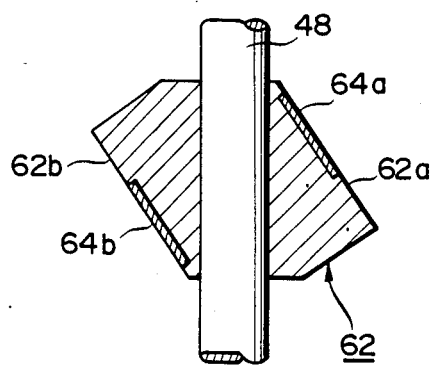
FIG. 7 is a cross-sectional view of the primary parts shown in FIG. 6.

More particularly, the core pedestal 62 is fixed to the support shaft 48 and of a hexahedron formed symmetrically in the vertical direction as shown in FIG. 5. As best seen from FIG. 6, the core pedestal 62 includes three pairs of faces 62a and 62b; 62c and 62d; 62e and 62f, each pair of which are obliquely opposed to each other in the vertical direction. Each pair of faces 62a and 62b; 62c and 62d; 62e and 62f includes cores 64a and 64b; 65a and 65b; 66a and 66b of ferrite or the like located thereon, respectively. In the illustrated embodiment, the cores (64, 65 or 66) are in the form of a thin disc embedded in the core pedestal 62.

In the illustrated embodiment, three pairs of cores 64, 65 and 66 are arranged on three lines perpendicular to each other and each oriented at an angle of 55° 44' relative to the axis of the touch pin 20, that is, Z-axis. In such a manner, the touch pin 20 can perform its function of detection equally in all the directions.

A pair of detection coils are mounted on the touch pin base 18 to correspond to each pair of cores 64, 65 and 66. In FIG. 1, a pair of detection coils 68a and 68b opposing to the pair of cores 64a and 64b are mounted in cup-shaped cores 70a and 70b, respectively. Each of the cup-shaped cores 70a and 70b includes a shaft 72a and 72b fixed to the spool 22 of the base 18. Thus, detection means operative in accordance with the principle of the differential transformer is defined by the stationary pair of coils 68a and 68b and the movable pair of cores 64a and 64b.

Gaps between the stationary pair of detection coils 68a and 68b and the movable pair of cores 64a and 64b can be adjusted by sliding the shafts 72a and 72b relative to the holding apertures of the spool.

Although the details are not illustrated, similar pairs of detection coils are disposed on the base 18 to correspond to the respective pairs of cores 65a, 65b and 66a, 66b. In this manner, three pairs of detection means are formed on three lines perpendicular to each other.

In the above arrangement, the touch pin 20 can be cushioned when contacted by the work because the base 18 itself is movable in all the directions. The touch pin 20 is suspended from the base 18. Furthermore, the touch pin 20 is supported to be freely movable in all the directions by means of the diaphragms 38, 40 and the support shaft 48. Therefore, the touch pin 20 is movable equally in all the directions when it is contacted by the work.

The motion of the touch pin 20 causes any displacement to occur between the pairs of cores on the holder body 12. This displacement can be detected by the pairs of detection coils on the base 18 as variaions of inductance as in the differential transformer. The variations of inductance also are detected equally in all the directions. Thus, touch signals can very precisely be detected in accordance with the present invention.

The pairs of detection coils are preferably arranged to form a bridge circuit which serves to obtain balanced signals of detection.

Although the present invention has been described as to three pairs of detection means, the number of pairs of detection means may be varied in accordance with the present invention. Although the illustrated embodiment of the present invention includes three pairs of detection means arranged on three lines perpendicular to each other and each oriented at an angle of 55° 44' relative to the Z-axis, such an arrangement and orientation may also be changed within the scope of the present invention.

Moreover, although the illustrated embodiment includes the hexahedron core pedestal, the configuration of the core pedestal is not limited to the hexahedron shape. For example, the core pedestal may be of a octahedron wherein four pairs of faces include four pairs of detection means to further improve the detection of the motion of the touch pin in all the directions.

We claim:

1. A touch signal probe for electrically detecting the contact of a touch pin with a work, comprising a probe case and a touch pin base positioned within said probe case to be movable in multi-directions and having a single dwell position, said base carrying said touch pin, said probe being characterized in that said probe comprises upper and lower diaphragms respectively mounted on the upper and lower portion of said touch pin base, said diaphragms supporting a touch pin holder body carrying said touch pin to be movable ralative to said touch pin base and in that said probe comprises a plurality of pairs of cores mounted on said touch pin holder body and a plurality of other pairs of detection coils mounted on said touch pin base respectively opposing to the respective one of said pairs of cores, whereby the motion of said touch pin in the multi-directions can electrically be detected by cooperation between said pairs of cores and said pairs of detection coils.

2. A touch signal probe as claimed in claim 1, wherein the touch pin base is movably supported upon a bottom plate of the probe case while maintaining its single dwell position by means of ball-seat bearings, and a biasing spring for urging the touch pin base against the bottom is provided between the touch pin base and the bottom plate.

3. A touch signal probe as claimed in claim 2, wherein the ball-seat bearing comprises three ball receivers fixed to the touch pin base, three seats mounted on the bottom plate, and three bearing balls inserted between each corresponding pair of ball receivers and seats, each of said three seats having a conical seat face, a V-shaped groove seat face and a flat seat surface, respectively, to obtain a single dwell position.

4. A touch signal probe as claimed in claim 1, wherein the touch pin holder body consists of a core pedestal of a hexahedron formed symmetrically in the longitudinal direction of the touch pin holder body, and on each of three pairs of faces of the core pedestal is provided with a pair of cores corresponding to each pair of detection coils mounted on the touch pin base in keeping with a predetermined gap therebetween, respectively.

* * * * *